United States Patent
Cai et al.

[11] Patent Number: 5,814,264
[45] Date of Patent: Sep. 29, 1998

[54] CONTINUOUS MANUFACTURING METHODS FOR POSITIVE TEMPERATURE COEFFICIENT MATERIALS

[75] Inventors: Feng Cai, Lake in the Hills; Tom J. Hall, Arlington Heights, both of Ill.

[73] Assignee: Littelfuse, Inc., Des Plaines, Ill.

[21] Appl. No.: 631,478

[22] Filed: Apr. 12, 1996

[51] Int. Cl.$^6$ .............. H01B 1/20; B29C 70/58; B29C 70/88
[52] U.S. Cl. .......... 264/408; 264/412; 264/401; 252/511; 252/512
[58] Field of Search ............ 252/500, 510, 252/511, 512; 264/40.1, 40.3, 40.6, 40.7, 406, 412, 408

[56] References Cited

U.S. PATENT DOCUMENTS

| | | | |
|---|---|---|---|
| 3,243,753 | 3/1966 | Kohler | 338/31 |
| 3,311,862 | 3/1967 | Rees | 338/211 |
| 3,351,882 | 11/1967 | Kohler et al. | 338/322 |
| 3,673,121 | 6/1972 | Meyer | 252/511 |
| 3,858,144 | 12/1974 | Bedard et al. | 338/22 R |
| 3,861,029 | 1/1975 | Smith-Johannsen et al. | 29/611 |
| 4,062,813 | 12/1977 | Andrianov et al. | 252/511 |
| 4,124,747 | 11/1978 | Murer et al. | 429/210 |
| 4,197,070 | 4/1980 | Koschmann | 425/135 |
| 4,272,471 | 6/1981 | Walker | 264/104 |
| 4,304,987 | 12/1981 | van Konynenburg | 219/553 |
| 4,334,351 | 6/1982 | Sopory | 29/611 |
| 4,426,633 | 1/1984 | Taylor | 338/25 |
| 4,545,926 | 10/1985 | Fouts, Jr. et al. | 252/511 |
| 4,548,740 | 10/1985 | von Tomkewitsch et al. | 252/511 |
| 4,880,577 | 11/1989 | Okita et al. | 264/22 |
| 4,885,457 | 12/1989 | Au . | |
| 5,171,774 | 12/1992 | Ueno et al. | 524/495 |
| 5,174,924 | 12/1992 | Yamada et al. | 252/511 |
| 5,196,145 | 3/1993 | Idhii et al. | 252/54 |
| 5,280,263 | 1/1994 | Sugaya | 338/22 R |
| 5,374,387 | 12/1994 | Barnes et al. | 264/211.23 |

FOREIGN PATENT DOCUMENTS

| | | |
|---|---|---|
| 0311142 A2 | 4/1989 | European Pat. Off. . |
| 0437239 A2 | 7/1991 | European Pat. Off. . |
| 0522863 A1 | 1/1993 | European Pat. Off. . |
| 63-292592 | 11/1988 | Japan . |
| 1167551 | 10/1969 | United Kingdom . |
| 2301223 | 11/1996 | United Kingdom . |
| WO 97/06660 | 2/1997 | WIPO . |

OTHER PUBLICATIONS

Meyer, J., *Polymer Engineering and Science*, "Glass Transition Temperature as a guide to selection of Polymers Suitable for PTC Materials," Nov., 1973, vol. 13, No.6.

*Primary Examiner*—Mark Kopec
*Attorney, Agent, or Firm*—Wallenstein & Wagner, Ltd.

[57] ABSTRACT

A method for producing a conductive polymeric composition exhibiting PTC behavior. The method includes the steps of: providing a quantity of polymer component having a melting point temperature $T_{mp}$, and a quantity of conductive filler component; mixing the quantity of polymer component and the quantity of conductive filler component in a receiving unit at a temperature greater than $T_{mp}$ to form a molten mixture; forcing the molten mixture from the receiving unit to form an element having an electrical resistivity; measuring the electrical resistivity of the element; comparing the measured electrical resistivity of the element to a predetermined electrical resistivity value; and, adjusting the quantity of conductive filler component relative to the quantity of polymer component based on the comparison between the measured electrical resistivity of the element and the predetermined electrical resistivity value to achieve a desired element having an electrical resistivity approximately equal to the predetermined electrical resistivity value.

26 Claims, 1 Drawing Sheet

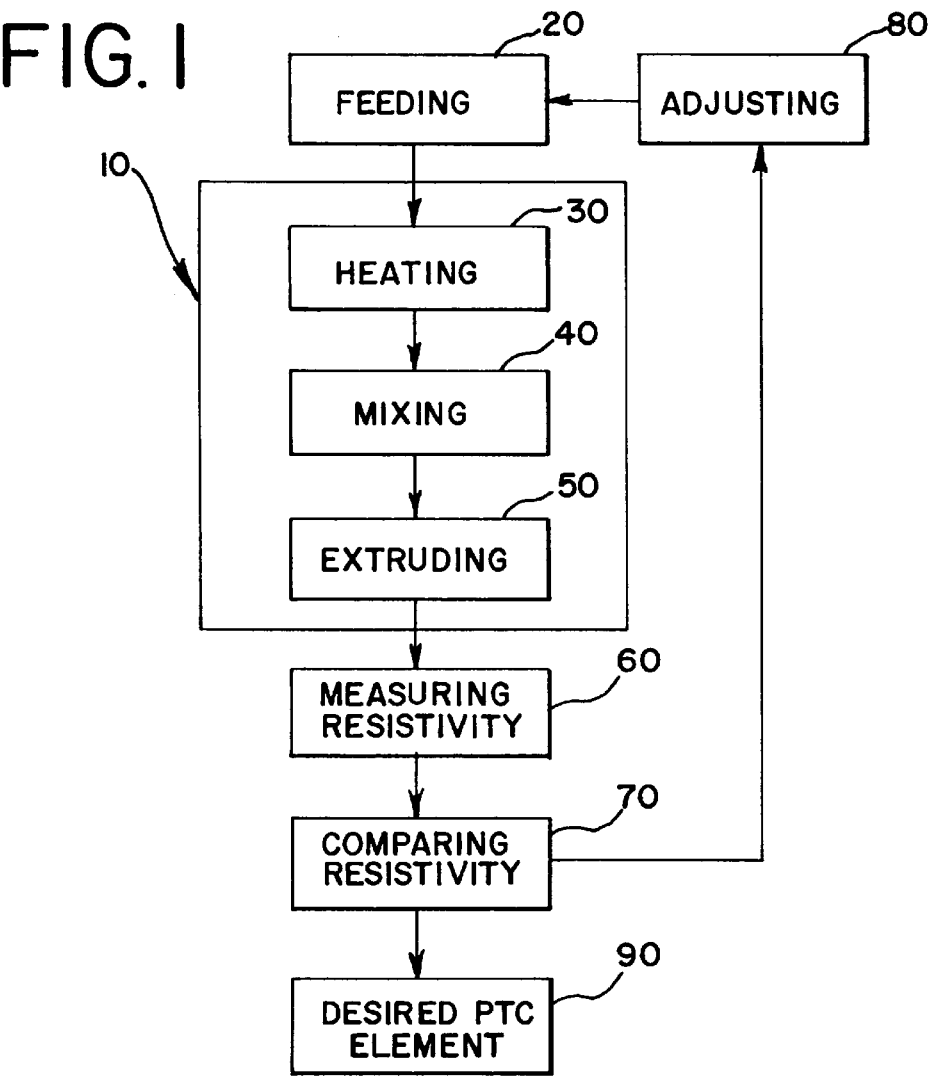
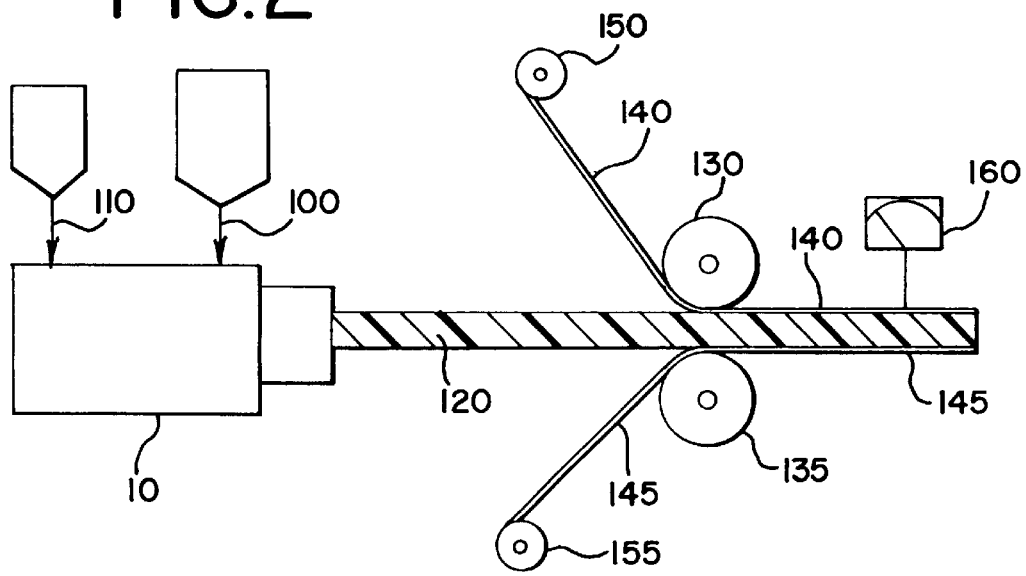

CONTINUOUS MANUFACTURING METHODS FOR POSITIVE TEMPERATURE COEFFICIENT MATERIALS

DESCRIPTION

Technical Field

The present invention provides a continuous, one-step method for producing a composition exhibiting positive temperature coefficient (PTC) behavior, and more particularly, a method which allows for in-line adjustment capabilities to produce a polymeric PTC composition.

BACKGROUND OF THE INVENTION

It is well known that the resistivity of many conductive materials change with temperature. Resistivity of a PTC conductive material increases as the temperature of the material increases. Many crystalline polymers, made electrically conductive by dispersing conductive fillers therein, exhibit this PTC effect. These polymers generally include polyolefins such as polyethylene, polypropylene and ethylene/propylene copolymers. At temperatures below a certain value, i.e., the critical or switching temperature, the polymer exhibits a relatively low, constant resistivity. However, as the temperature of the polymer increases beyond this point, the resistivity of the polymer sharply increases with a slight increase in temperature. Devices exhibiting PTC behavior have been used as overcurrent protection in electrical circuits comprising a power source and additional electrical components in series with the PTC device. Under normal operating conditions in the electrical circuit, the resistance of the load and the PTC device is such that relatively little current flows through the PTC device. Thus, the temperature of the device due to $I^2R$ heating remains below the critical or switching temperature, and the device is said to be in an equilibrium state (i.e., the rate at which heat is generated by $I^2R$ heating is equal to the rate at which the device is able to lose heat to its surroundings). If the load is short circuited or the circuit experiences a power surge, the current flowing through the PTC device increases and its temperature (due to $I^2R$ heating) rises rapidly to its critical temperature. At this point, a great deal of power is dissipated in the PTC device and the PTC device becomes unstable (i.e., the rate at which the device generates heat is greater than the rate at which the device can lose heat to its surroundings). This power dissipation only occurs for a short period of time (i.e., a fraction of a second), however, because the increased power dissipation will raise the temperature of the PTC device to a value where the resistance of the PTC device has become so high that the original current is limited to a negligible value. This new current value is enough to maintain the PTC device at a new, high temperature/high resistance equilibrium point. This negligible or trickle through current value will not damage the electrical components which are connected in series with the PTC device. Thus, the PTC device acts as a form of a fuse, reducing the current flow through the short circuit load to a safe, low value when the PTC device is heated to the critical temperature range. Upon interrupting the current in the circuit, or removing the condition responsible for the short circuit (or power surge), the PTC device will cool down below its critical temperature to its normal operating, low resistance state. The effect is a resettable, electrical circuit protection device.

Polymeric PTC compositions are commonly used in circuit protection devices such as those generally described above. Processes used to manufacture polymeric PTC compositions include blending a polymer component and a conductive filler component in a mixer so that the conductive filler component is uniformly dispersed throughout the polymer component. The material is removed from the mixer and chopped into pellets. The pellets are then fed to an extruder where the composition is extruded into a thin sheet. See for example U.S. Pat. No. 5,174,924. Other processes include removing the composition from the mixer, chopping it into small pieces and then compression molding the pieces into a slab. See for example U.S. Pat. Nos. 4,237,441 and 4,545,926.

Another commonly used process to manufacture polymeric PTC compositions includes blending the polymer component and the conductive filler component between heated rolls of a mixing roll. Upon uniform dispersion, the composition is cooled and crushed into pellets. The pellets are then compression molded to form a desired shape. See for instance U.S. Pat. Nos. 4,237,441, 4,880,577, 5,171,774 and 5,280,263.

It is well known that the electrical characteristics of polymeric PTC compositions are dependent upon certain properties of the materials making up the composition. It is also known that the processing conditions directly effect the electrical characteristics of polymeric PTC compositions. Prior methods used to manufacture PTC compositions generally start with a predetermined amount of polymer component and a predetermined amount of conductive filler component. The two components are then subjected to a number of manufacturing techniques (i.e., mixing, feeding, melting, blending, chopping, crushing, pumping, and shaping) to produce a composition. Only after the entire predetermined amounts of polymer and conductive filler components have undergone the various manufacturing steps could one determine the electrical properties of the final composition. The aforementioned prior processes do not disclose a method whereby the electrical characteristics of a composition may be monitored, adjusted and controlled in a single continuous process.

SUMMARY OF THE INVENTION

Accordingly, it is an object of the present invention to provide a continuous process whereby the electrical characteristics of a composition may be monitored and ultimately controlled by adjusting various process conditions which are known to influence the electrical characteristics of a composition.

It is another object of the present invention to combine the several manufacturing techniques into one continuous process which provides a uniform dispersion of conductive filler component throughout the polymer component so that compositions having uniform electrical properties and lower resistivities can be achieved.

It is a final object of the present invention to provide a method which significantly reduces the total amount of energy required to manufacture a PTC composition, thus producing a composition which has a low initial resistivity yet exhibits significant PTC behavior.

In one aspect of the present invention there is provided a method for producing a conductive polymeric composition comprising the steps of:

providing a quantity of polymer component having a melting point temperature $T_{mp}$ and a quantity of conductive filler component;

mixing the quantity of polymer component and the quantity of conductive filler component in a receiving unit at a temperature greater than $T_{mp}$ to form a molten mixture;

forcing the molten mixture from the receiving unit to form an element having an electrical resistivity;

measuring the electrical resistivity of the element;

comparing the measured electrical resistivity of the element to a predetermined electrical resistivity value; and, adjusting the quantity of conductive filler component relative to the quantity of polymer component based on the comparison between the measured electrical resistivity of the element and the predetermined electrical resistivity value to achieve a desired element having an electrical resistivity approximately equal to the predetermined electrical resistivity value.

In a second aspect, the present invention provides a method for producing a polymeric composition exhibiting PTC behavior comprising the steps of:

feeding a quantity of polymer component and a quantity of conductive filler component to a receiving unit;

heating and exerting mechanical shear on the quantity of polymer component and the quantity of conductive filler component in the receiving unit to form a mixture of molten polymer component having conductive filler component dispersed throughout;

forcing the molten mixture from the receiving unit at a pressure greater than atmospheric pressure to form a PTC element having an electrical resistivity;

measuring the electrical resistivity of the PTC element;

comparing the measured electrical resistivity of the PTC element to a predetermined electrical resistivity value; and, adjusting the quantity of the conductive filler component relative to the quantity of polymer component to be fed to the receiving unit based on a difference between the measured electrical resistivity of the PTC element and the predetermined electrical resistivity value to achieve a desired PTC element having an electrical resistivity approximately equal to the predetermined electrical resistivity value.

In a final aspect, the present invention provides a method for producing an electrical device exhibiting PTC behavior comprising the steps of:

feeding a quantity of polymer component and a quantity of conductive filler component to a receiving unit;

heating and exerting mechanical shear on the quantity of polymer component and the quantity of conductive filler component in the receiving unit to form a molten mixture of polymer component having conductive filler component dispersed throughout;

forcing the molten mixture from the receiving unit at a pressure greater than atmospheric pressure to form a PTC element having an electrical resistivity;

feeding the PTC element to a pair of rollers which form a slot having a predetermined thickness, the rollers being adapted to rotate so as to forward the PTC element through the slot, the PTC element having a top surface and a bottom surface;

simultaneously forwarding a first and a second electrode through the slot formed by the pair of rollers, the first electrode coming into contact with and adhering to the top surface of the PTC element and the second electrode coming into contact with and adhering to the bottom surface of the PTC element to form a laminate;

measuring the electrical resistivity of the PTC element;

comparing the measured electrical resistivity of the PTC element to a predetermined electrical resistivity value;

adjusting one of the following parameters, based on a difference between the measured electrical resistivity of the PTC element and the predetermined electrical resistivity value, to achieve a desired PTC element having an electrical resistivity approximately equal to the predetermined electrical resistivity value:

(i) the quantity of conductive filler fed to the receiving unit;

(ii) the amount of heat applied to the quantity of polymer component and the quantity of conductive filler component in the receiving unit;

(iii) the amount of mechanical shear exerted on the quantity of polymer component and the quantity of conductive filler component in the receiving unit; or, (iv) the quantity of polymer component fed to the receiving unit; and, forming the laminate into a plurality of electrical devices.

Other advantages and aspects of the present invention will become apparent upon reading the following description of the drawings and detailed description of the present invention.

BRIEF DESCRIPTION OF THE DRAWINGS

A better understanding of the present invention will be had upon reference to the following detailed description and accompanying drawings, wherein:

FIG. 1 is a flow chart illustrating the steps for manufacturing PTC materials according to one embodiment of the present invention; and, FIG. 2 is a diagrammatic cross-sectional view of the process and apparatus according to one embodiment of the present invention.

DETAILED DESCRIPTION OF THE INVENTION

While this invention is susceptible of embodiment in many different forms, there is shown in the drawings and will herein be described in detail preferred embodiments of the invention with the understanding that the present disclosure is to be considered as an exemplification of the principles of the invention. For example, the preferred embodiments describe continuous methods for producing polymeric PTC materials which allow for in-line adjustments based on a comparison between a predetermined electrical property and a measured electrical property of the material. However, the invention contemplates methods for producing conductive polymer compositions in general.

The methods for manufacturing polymeric PTC materials according to the present invention are carried out in a single receiving unit. A quantity of polymer component having a melting point temperature $T_{mp}$ and a quantity of conductive filler component are thoroughly mixed in the receiving unit at a temperature greater than $T_{mp}$ to form a molten mixture. The molten mixture is then forced from the receiving unit to form an element which has an electrical resistivity. The electrical resistivity of the element is measured and compared to a predetermined electrical resistivity value. Based on the comparison between the measured resistivity and the predetermined resistivity, the quantity of conductive filler component is adjusted relative to the quantity of polymer component to achieve a desired element having an electrical resistivity approximately equal to the predetermined electrical resistivity value. That is, if the measured resistivity is lower than the predetermined resistivity value, the quantity of conductive filler is decreased relative to the quantity of polymer component. Contrarily, if the measured resistivity is higher than the predetermined resistivity value, the quantity of conductive filler is increased relative to the quantity of polymer component. The relative quantity of conductive filler component can be adjusted by either: (a) increasing the quantity of conductive filler component fed to the receiving unit; or, (b) decreasing the quantity of polymer component fed to the receiving unit.

Preferably, the methods of the present invention are used to manufacture materials having electrical resistivities, measured at approximately 25° C., of less than 5 ohm cm, more preferably less than 2 ohm cm, and especially less than 1 ohm cm. However, the methods of the present invention can be used to manufacture materials having any desired electrical resistivity.

The flow chart of FIG. 1 illustrates a preferred method of manufacturing polymeric PTC materials according to the present invention. The process is carried out in a single receiving unit represented by reference numeral 10. A quantity of polymer component having a melting point temperature, $T_{mp}$, and a quantity of conductive filler component are fed 20 to the receiving unit 10. In the receiving unit 10, the polymer component and the conductive filler component are heated 30 and subjected to mechanical shear (i.e., mixed) 40 to form a mixture of molten polymer component having conductive filler component dispersed throughout. The molten mixture is then forced 50, preferably extruded, from the receiving unit 10 at a pressure greater than atmospheric pressure to form a PTC element.

The PTC element is allowed to cool to approximately room temperature before measuring 60 the electrical resistivity of the PTC element. The measured resistivity is then compared 70 to a predetermined electrical resistivity value. As mentioned above, generally the predetermined value will be less than 5 ohm cm, more preferably less than 2 ohm cm, and especially less than 1 ohm cm. Based on a difference between the measured resistivity of the PTC element and the predetermined resistivity value, the quantity of conductive filler component being fed to the receiving unit is adjusted 80 relative to the quantity of polymer component being fed to the receiving unit 10, thus, achieving a desired PTC element 90 having an electrical resistivity approximately equal to the predetermined electrical resistivity value.

In addition to adjusting the relative quantity of conductive filler component fed to the receiving unit, the following process conditions can also be adjusted to achieve the desired PTC element: (i) the amount of heat applied to the polymer component and the conductive filler component in the receiving unit; (ii) the amount of mechanical shear exerted on the polymer component and the conductive filler component in the receiving unit; and, (iii) the amount of pressure under which the molten mixture is forced from the receiving unit.

The PTC element having the desired resistivity can be terminated in any conventional manner. In a preferred embodiment, the desired PTC element is laminated between two metal foil electrodes in a heated press. In a more preferred embodiment, however, termination of the desired PTC element takes place in a continuous process.

Referring to FIG. 2, polymer component 100 and conductive filler component 110 are fed to the receiving unit 10. After the polymer component 100 and the conductive filler component 110 are heated and mixed a PTC element 120 in the form of a sheet is extruded from the receiving unit 10. The PTC element 120 is fed to a pair of rollers 130, 135 which form a slot having a predetermined thickness. The rollers 130, 135 are adapted to rotate so as to forward the PTC element 120 through the slot. Simultaneously, first and second electrodes 140, 145 are forwarded from supply rolls 150, 155 through the slot formed by rollers 130, 135. The first electrode 140 contacts and adheres to a top surface of the PTC element 120, while the second electrode 145 contacts and adheres to a bottom surface of the PTC element 120. To improve adhesion of the electrodes 140, 145 to the PTC element 120, the rollers 130, 135 are heated to a temperature above 25° C. but below the melt temperature of the polymer component 100. After the PTC element 120 has been terminated, the resistivity of the PTC element 120 is measured using any conventional means (indicated by reference numeral 160). As previously mentioned, the measured resistivity of the PTC element 120 is compared to a predetermined resistivity. Based on a difference between the measured resistivity and the predetermined resistivity, the quantity of conductive filler component 110 being fed to the receiving unit 10 is adjusted relative to the quantity of polymer component 100 being fed to the receiving unit 10, thus, achieving a desired PTC element having an electrical resistivity approximately equal to the predetermined electrical resistivity value.

In addition, the terminated desired PTC element can also be subjected to an irradiation treatment causing the polymer component to become cross-linked.

To stabilize the resistivity of the desired PTC element, in a preferred method of the present invention the desired PTC element is subjected to a thermal treatment. The thermal treatment can occur either before or after the desired PTC element has been terminated. The thermal treatment consists of raising the temperature of the PTC element to a range between room temperature and the melting point of the polymer component for a first period of time and then subjecting the PTC element to a temperature below room temperature for a second period of time. Generally, the first and second periods of time should be greater than five minutes. It has been determined that repeated cycles of thermal treatment provide PTC elements with the most stable resistivities.

The polymer component used in the present invention may be a single polymer or a mixture of two or more different polymers. Generally, the polymer component may comprise a polyolefin having a crystallinity of at least 40%. Suitable polymers include polyethylene, polypropylene, polybutadiene, polyethylene acrylates, ethylene acrylic acid copolymers, and ethylene propylene copolymers. In a preferred embodiment, the polymer component is a modified polyethylene which comprises about 90–99% by weight high density polyethylene and about 1–10% by weight maleic anhydride (such a polymer is manufactured by Du Pont and sold under the tradename Fusabond™).

Suitable conductive filler components to be used in the present invention include powders, flakes or spheres of the following metals; nickel, silver, gold, copper, silver-plated copper, or metal alloys. The conductive filler component may also comprise carbon black, carbon flakes or spheres, or graphite. Preferably, the conductive filler component used in the present invention is carbon black.

EXAMPLE 1

A conductive composition was produced using a Leistritz twin screw extruder compounding system, Model ZSE-27. A quantity of modified polyethylene (manufactured by Du Pont under the tradename Fusabond 'E' MB-100D) having a specific gravity of 0.90–0.96 and a melt temperature of approximately 130° C. was placed in a gravimetric feeder. A quantity of carbon black (manufactured by Columbian Chemicals under the tradename Raven 430) was also placed in a gravimetric feeder. The modified polyethylene and carbon black were fed to the Leistritz melt/mix/pump system. The processing conditions for the compounding system were as follows: melt temperature, 239° C.; screw speed, 120 rpm; screw configuration, co-rotating; melt pressure, 2100 p.s.i.; and line speed 6.45 feet per minute. A sample PTC element was extruded to a thickness of 0.011 inch. The specific energy consumed during the entire process (i.e., melting, mixing, and extruding) was 0.193 kw hr/kg.

The resistivity of the extruded element was measured while the molten mixture was forced from the melt/mix/pump system. The measured resistivity was compared to a predetermined resistivity (in this case approximately 1.50 ohm cm). Based on a difference between the measured resistivity and the predetermined resistivity, the quantity of carbon black fed to the melt/mix/pump system was adjusted relative to the quantity of modified polyethylene fed to the melt/mix/pump system. This process was continued until the measured resistivity came within an acceptable range of the predetermined resistivity. The desired PTC element had a final composition of 50.80% by weight modified polyethylene and 49.20% carbon black.

The desired PTC element was laminated between two metal foil electrodes in a heated press. After the laminate was removed from the press and allowed to cool without further pressure, the laminate was sheared into a number of 0.15 inch×0.18 inch electrical devices. Conductive terminals were connected with solder to each electrical device. The electrical devices were then subjected to a thermal treatment which consisted of subjecting the electrical device to a temperature of 85° C. for 15 minutes and then to a temperature of −55° C. for 15 minutes. This comprised one cycle. The electrical devices were subjected to a total of three cycles.

Electrical devices made according to Example 1 had an average electrical resistance at 25° C. of approximately 0.120 ohm. The composition of Example 1 had a resistivity at 25° C. of 1.54 ohm cm and a peak resistivity at a temperature greater than 25° C. of $2.4 \times 10^7$ ohm cm.

EXAMPLE 2

A second composition was made using the same equipment as in Example 1. A quantity of high density polyethylene (manufactured by Quantum Chemicals under the tradename Petrothene LM 8520) having a density of 0.96 g/cc and a melt temperature of approximately 130° C. was placed in a gravimetric feeder, A quantity of carbon black (manufactured by Columbian Chemicals under the tradename Raven 430) was also placed in a gravimetric feeder. The high density polyethylene and carbon black were fed to the Leistritz melt/mix/pump system. The processing conditions for the compounding system were as follows: melt temperature, 239° C.; screw speed, 125 rpm; screw configuration, co-rotating; melt pressure, 1160 p.s.i.; and line speed 5.50 feet per minute. A sample PTC element was extruded to a thickness of 0.010 inch. The specific energy consumed during the entire process (i.e., melting, mixing, and extruding) was 0.200 kw hr/kg.

The resistivity of the extruded composition was measured and compared to a predetermined resistivity. The quantity of carbon black was adjusted relative to the quantity of polyethylene until the measured resistivity was within an acceptable range of the predetermined resistivity. The desired PTC element had a composition of 54% by weight high density polyethylene and 46% by weight carbon black.

Electrical devices were made from the desired PTC element according to the process in Example 1. The composition of Example 2 had a resistivity at 25° C. of 1.30 ohm cm and a peak resistivity at a temperature greater than 25° C. of $2.3 \times 10^5$ ohm cm.

EXAMPLE 3

A third composition was made using the same equipment as in Example 1. A quantity of high density polyethylene (manufactured by Quantum Chemicals under the tradename Petrothene LM 6007) having a density of 0.96 g/cc and a melt temperature of approximately 130° C. was placed in a gravimetric feeder. A quantity of carbon black (manufactured by Columbian Chemicals under the tradename Raven 430) was also placed in a gravimetric feeder. The high density polyethylene and carbon black were fed to the Leistritz melt/mix/pump system. The processing conditions for the compounding system were as follows: melt temperature, 234° C.; screw speed, 135 rpm; screw configuration, co-rotating; melt pressure, 1300 p.s.i.; and line speed 8.40 feet per minute. A sample PTC element was extruded to a thickness of 0.009 inch. The specific energy consumed during the entire process (i.e., melting, mixing, and extruding) was 0.288 kw hr/kg.

The resistivity of the extruded composition was measured and compared to a predetermined resistivity. The quantity of carbon black was adjusted relative to the quantity of polyethylene until the measured resistivity was within an acceptable range of the predetermined resistivity. The desired PTC element had a composition of 49% by weight high density polyethylene and 51% by weight carbon black.

Electrical devices were made from the desired PTC element according to the process in Example 1. The composition of Example 3 had a resistivity at 25° C. of 0.879 ohm cm and a peak resistivity at a temperature greater than 25° C. of $3.98 \times 10^4$ ohm cm.

What is claimed is:

1. A continuous method for producing a conductive polymeric composition comprising the steps of:

providing a quantity of polymer component having a melting point temperature $T_{mp}$ and a quantity of conductive filler component;

mixing the quantity of polymer component and the quantity of conductive filler component in a receiving unit at a temperature greater than $T_{mp}$ to form a molten mixture;

forcing the molten mixture from the receiving unit to form a laminar sheet having a thickness of less than 0.02 inch and an electrical resistivity;

measuring the electrical resistivity of the laminar sheet;

comparing the measured electrical resistivity of the laminar sheet to a predetermined electrical resistivity value;

adjusting the quantity of conductive filler component relative to the quantity of polymer component based on the comparison between the measured electrical resistivity of the element and the predetermined electrical resistivity value to achieve a desired laminar sheet having a composition of about 35–70% by weight conductive filler component and about 30–65% by weight polymer component and an electrical resistivity at 25° C. of approximately less than 2 ohm cm.

2. The method of claim 1, wherein the desired element exhibits PTC behavior.

3. The method of claim 1, wherein the polymer component comprises a polyolefin.

4. The method of claim 1, wherein the polymer component comprises polyethylene.

5. The method of claim 1, wherein the polymer component comprises polyethylene and maleic anhydride.

6. The method of claim 1, wherein the polymer component comprises about 90–99% by weight polyethylene and about 1–10% by weight maleic anhydride.

7. The method of claim 1, wherein the conductive filler component comprises carbon black.

8. The method of claim 1, wherein the value of the predetermined resistivity is less than 1 ohm cm.

9. The method of claim 1, wherein the laminar sheet is less than 0.01 inch thick.

10. The method of claim 2, wherein the desired element has a peak resistivity at a temperature greater than 25° C. of at least 10,000 ohm cm.

11. The method of claim 2, wherein the desired element has a peak resistivity at a temperature greater than 25° C. of at least 100,000 ohm cm.

12. The method of claim 1, wherein a total specific energy of less than 1 kw hr kg$^{-1}$ is consumed during the steps of:
mixing the quantity of polymer component and the quantity of conductive filler component in a receiving unit at a temperature greater than $T_{mp}$ to form a molten mixture; and,
forcing the molten mixture from the receiving unit to form an element having an electrical resistivity.

13. A continuous method for producing a polymeric composition exhibiting PTC behavior comprising the steps of:
feeding a quantity of polymer component comprised of polyethylene and maleic anhydride and a quantity of conductive filler component to a receiving unit;
heating and exerting mechanical shear on the quantity of polymer component and the quantity of conductive filler component in the receiving unit to form a mixture of molten polymer component having conductive filler component dispersed throughout;
forcing the molten mixture from the receiving unit at a pressure greater than atmospheric pressure to form a PTC element having a thickness of less than 0.02 inch and an electrical resistivity;
measuring the electrical resistivity of the PTC element;
comparing the measured electrical resistivity of the PTC element to a predetermined electrical resistivity value; and,
adjusting the quantity of conductive filler component relative to the quantity of polymer component to be fed to the receiving unit based on a difference between the measured electrical resistivity of the PTC element and the predetermined electrical resistivity value to achieve a desired PTC element having a composition of about 35–70% by weight conductive filler component and about 30–65% by weight polymer component, an electrical resistivity at 25° C. of approximately less than 2 ohm cm, and a peak resistivity at a temperature greater than 25° C. of at least 10,000 ohm cm.

14. The method of claim 13, further comprising the step of adjusting the amount of heat applied to the quantity of polymer component and the quantity of conductive filler component in the receiving unit based on the difference between the measured electrical resistivity of the PTC element and the predetermined electrical resistivity value.

15. The method of claim 13, further comprising the step of adjusting the amount of mechanical shear exerted on the quantity of polymer component and the quantity of conductive filler component in the receiving unit based on the difference between the measured electrical resistivity of the PTC element and the predetermined electrical resistivity value.

16. The method of claim 13, wherein the molten mixture reaches a temperature of at least 200° C. before being forced from the receiving unit.

17. The method of claim 13, wherein the molten mixture is extruded from the receiving unit to form a laminar sheet.

18. The method of claim 13, wherein the molten mixture is forced from the receiving unit under a pressure greater than 500 psi.

19. The method of claim 13, wherein a total specific energy of less than 1 kw hr kg$^{-1}$ is consumed during the steps of:
feeding a quantity of polymer component and a quantity of conductive filler component to a receiving unit;
heating and exerting mechanical shear on the quantity of polymer component and the quantity of conductive filler component in the receiving unit to form a mixture of molten polymer component having conductive filler component dispersed throughout; and,
forcing the molten mixture from the receiving unit at a pressure greater than atmospheric pressure to form a PTC element having an electrical resistivity.

20. The method of claim 13, further including the step of subjecting the desired PTC element to a thermal treatment comprising the steps of raising the temperature of the PTC element to a range between room temperature and the melting point of the polymer component for a first period of time and then subjecting the PTC element to a temperature below room temperature for a second period of time.

21. A continuous method for producing an electrical device exhibiting PTC behavior comprising the steps of:
feeding a quantity of polymer component and a quantity of conductive filler component to a receiving unit;
heating and exerting mechanical shear on the quantity of polymer component and the quantity of conductive filler component in the receiving unit to form a molten mixture of polymer component having conductive filler component dispersed throughout;
forcing the molten mixture from the receiving unit at a pressure greater than atmospheric pressure to form a PTC element having a thickness of less than 0.02 inch and an electrical resistivity, the PTC element having a top surface and a bottom surface;
feeding the PTC element to a pair of rollers which form a slot having a predetermined thickness, the rollers being adapted to rotate so as to forward the PTC element through the slot;
simultaneously forwarding a first and a second electrode through the slot formed by the pair of rollers, the first electrode coming into contact with and adhering to the top surface of the PTC element and the second electrode coming into contact with and adhering to the bottom surface of the PTC element to form a laminate;
measuring the electrical resistivity of the PTC element;
comparing the measured electrical resistivity of the PTC element to a predetermined electrical resistivity value;
adjusting one of the following parameters, based on a difference between the measured electrical resistivity of the PTC element and the predetermined electrical resistivity value, to achieve a desired PTC element having an electrical resistivity at 25° C. of approximately less than 2 ohm cm:

(i) the quantity of conductive filler fed to the receiving unit;
(ii) the amount of heat applied to the quantity of polymer component and the quantity of conductive filler component in the receiving unit;
(iii) the amount of mechanical shear exerted on the quantity of polymer component and the quantity of conductive filler component in the receiving unit; or,
(iv) the quantity of polymer component fed to the receiving unit; and, forming the laminate into a plurality of electrical devices, the electrical devices having a resistance at 25° C. of less than 0.5 ohm.

22. The method of claim 21, wherein the first and second electrodes comprise a metal foil.

23. The method of claim 21, wherein the pair of rollers is heated to a temperature above 25° C.

24. The method of claim 21, wherein the electrical devices have a resistance at 25° C. of less than 0.3 ohm.

25. The method of claim 21, wherein the electrical devices are subjected to a thermal treatment.

26. The method of claim 21, wherein the electrical devices are subjected to an irradiation treatment causing the polymer component to become cross-linked.

* * * * *